Jan. 23, 1951 B. R. WALSH 2,539,044
FLUID SEPARATION APPARATUS
Filed Aug. 27, 1945 2 Sheets-Sheet 1

Inventor
Bruce R. Walsh
By G. M. Houghton
His Attorney

Jan. 23, 1951        B. R. WALSH        2,539,044

FLUID SEPARATION APPARATUS

Filed Aug. 27, 1945        2 Sheets-Sheet 2

Inventor
Bruce R. Walsh
By   *A. M. Houghton*
Attorney

Patented Jan. 23, 1951

2,539,044

UNITED STATES PATENT OFFICE 2,539,044

FLUID SEPARATION APPARATUS

Bruce R. Walsh, Pittsburgh, Pa., assignor to Gulf Research & Development Company, Pittsburgh, Pa., a corporation of Delaware Application August 27, 1945, Serial No. 612,801

6 Claims. (Cl. 183—2.5)

This invention relates to fluid separation apparatus. More particularly, the invention relates to the separation of gases from liquids having gases dispersed therein.

A principal object of this invention is the provision of a new apparatus for the separation of gases from gas/liquid dispersions. Still further objects include the provision of a new form of an internal-external gear pump which may be employed in gas/liquid separations, the provision of fluid separation systems incorporating this new separator and the provision of apparatus which permits gas/liquid dispersions to be subjected to the combined, simultaneous action of reduced fluid pressure and centrifugal force.

The entire scope of applicability of this invention and still further objects will become apparent from the detailed description given below.

These objects are accomplished according to the present invention by passing the liquid containing gas dispersed therein into a succession of enclosed spaces, such as those formed between the teeth of the gears and the housing abutments in contact with the outer edge of the annular gear of an internal-external gear pump, causing each such space to increase in volume without removing fluid therefrom or permitting fluid to flow into it, and then discharging the liquid and separated gas, after the volume increase, from the expanded spaces into a region which desirably possesses a smaller external fluid pressure than the pressure existing upon the liquid dispersion before it was charged into each tooth space and before the volume thereof was increased.

The particular apparatus provided by this invention comprises a fluid separator quite similar to a pump of the internal-external gear type.

Figure 1:
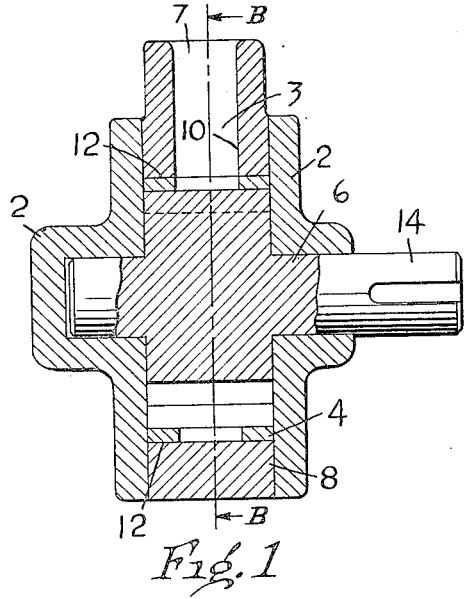
Figure 2:
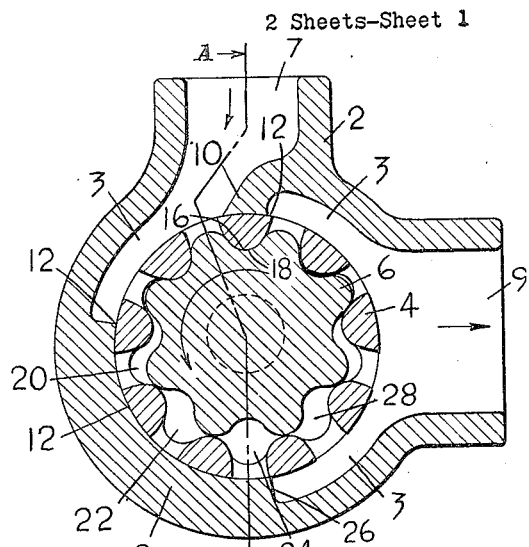
Figure 3:
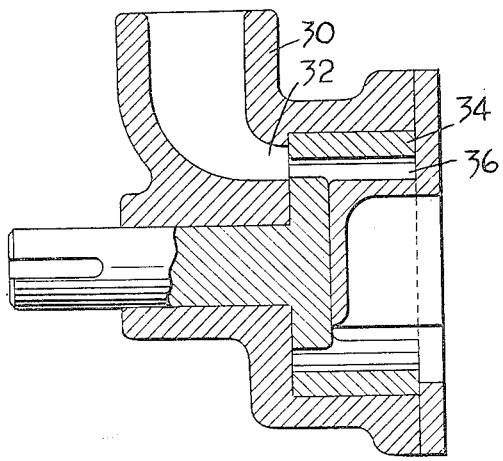
Figure 4:
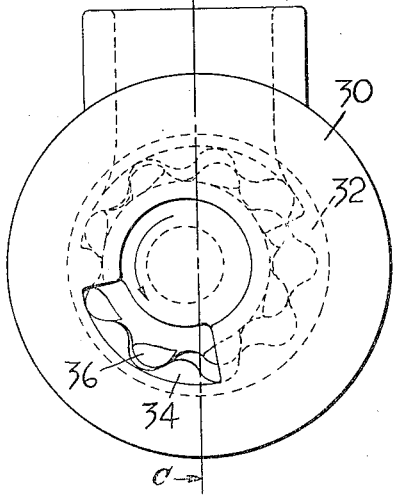
Figure 5:
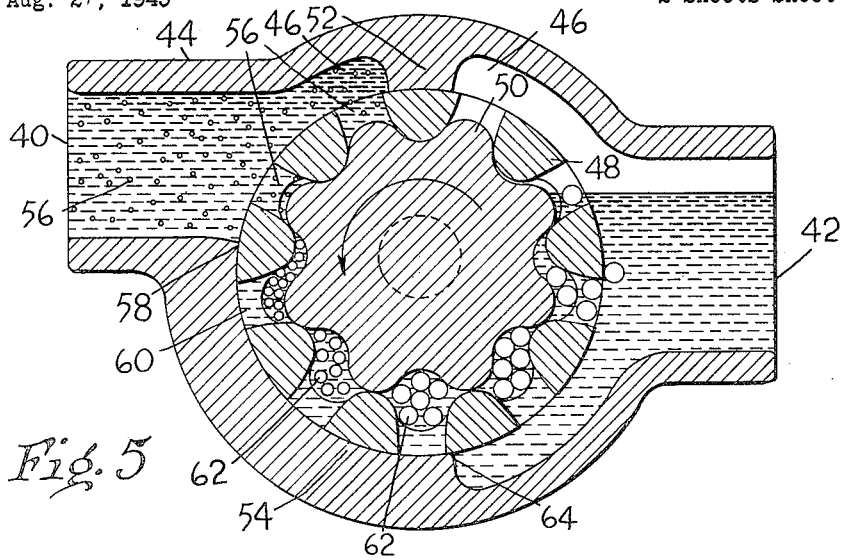
Figure 6:
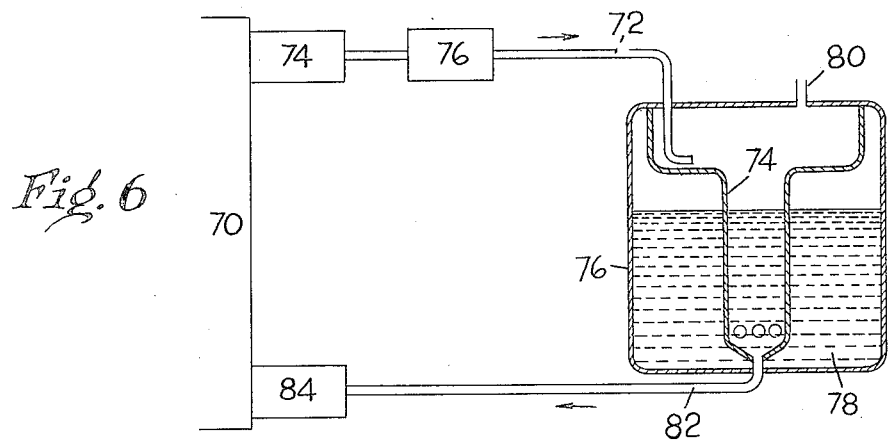
Figure 7:
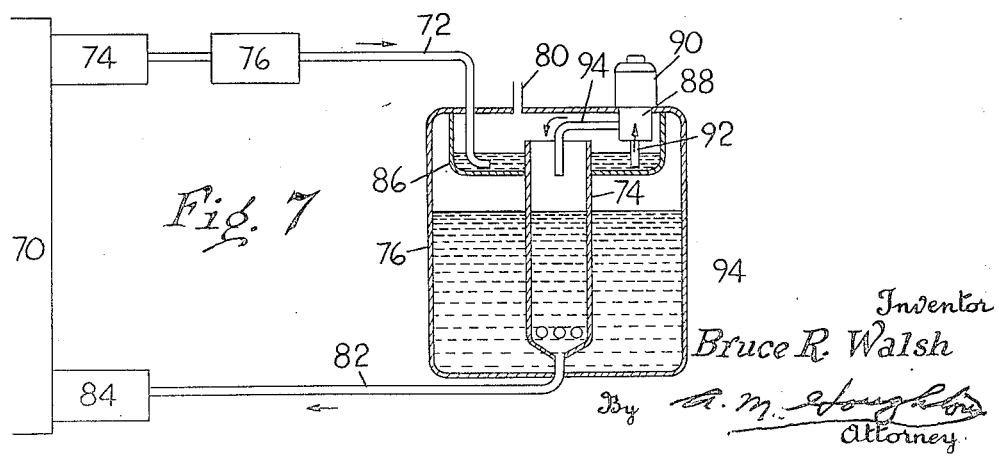

Reference is made to the attached drawings for a more comprehensive understanding of this invention. In these drawings:

Figure 1 is a longitudinal vertical section of a fluid separator of this invention along the line A—A of Figure 2, Figure 2 is a transverse section of the separator of Figure 1 through the center on the line B—B of Figure 1, Figure 3 is a transverse section of internal-external rotary gear separator along the line C—C of Figure 4, Figure 4 is a side view of the separator of Figure 3, Figure 5 is an operational view in section of a rotary gear separator of this invention, Figure 6 is a diagrammatic side view of a conventional type of airplane lubrication system, Figure 7 is a diagrammatic side view of an airplane lubrication system incorporating the gas/liquid separator of this invention.

Referring to the drawings in detail, Figure 1 shows the separator housing 2 provided with a chamber 3 in which are located an annular gear 4 and a pinion 6. The chamber 3 is also provided with an inlet 7 and an outlet 9.

Figure 2 shows a side view of the housing and gear arrangement illustrated in Figure 1. The inner gear 6 is the driving gear and the annular gear 4 is the idler gear which is caused to rotate by intermesh with the pinion 6. The annular gear 4 is machined so that it will rotate freely within the housing 2, but form substantially fluid tight contacts with the abutments 8 and 10 of the housing 2 at the points 12 where the external face of the gear 4 contacts the housing abutments 8 and 10. The pinion 6 is smaller than the annular gear 4 and possesses one less tooth than the annular gear. The pinion 6 is placed eccentrically to the annular gear 4 so that the two gears mesh at the point where the annular gear 4 touches the housing abutment of boss 10. The pinion 6 is also of such size that a portion of every one of its teeth contacts a portion of all adjacent teeth of the annular gear 4.

It will be seen that as the pinion 6 is caused to rotate by application of a torque to the shaft 14, the annular gear 4 will also be caused to rotate.

Focusing attention upon the portion of the gears which are adjacent the boss 10 at the beginning of rotation, it will be observed that as the gear set rotates counterclockwise, the direction of rotation of the gears in operation, the adjacent faces of the gears, i. e., the addendum 16 of gear 4 and the dedendum 18 of pinion 6, will gradually recede from one another. This recession will continue as the gears rotate until the gears have rotated through 180°, i. e., to a point directly opposite to the boss 10, when the gear faces will begin to come together again.

This relative movement of the gear faces away from and toward one another during rotation results in the formation of spaces of continuously varying size.

When the gear set has rotated a sufficient distance, the outer periphery of the annular gear 4 will contact the abutment 8 of the housing 2. The contact between the abutment 8 and the outside of the gear 4 is such that flow of fluid between these two adjacent points is not possible. As a result, fluid tight compartments, e. g., 20, 22 and 24 are formed by the opposed faces of the adjacent teeth of the annular gear 4, the pinion 6 and the abutment 8. Since the space between the gear teeth increases as the gear set rotates up to the point just before the end 26 of the abutment 8, these compartments continuously increase in size. When the gear rotates still further so that the trailing, outer tooth edge of the annular gear 4 passes beyond the end 26 of the abutment 8, the space between the gears, e. g., space 28, is no longer sealed off from the housing chamber 3, but is in fluid contact therewith.

The length of the abutment 8 determines the extent to which the spaces between the adjacent faces of the teeth of gears 4 and 6 will be sealed off from the chamber 3 and the length of time during rotation of the gears in which no fluid may flow into or out of the gear tooth spaces. The length of this abutment is most desirably expressed in terms of the percentage of the maximum volume which may be produced in the compartments or interdental spaces described, e. g., space 28, at which the forward part 12 of the abutment 8 first contacts the outer periphery of gear 4. In other words, the length of the abutment 8 may be expressed in terms of percentage of the volume of the space between the teeth when a tooth space first becomes sealed off by the abutment 8. This expression for the length of the abutment is termed percentage cut-off.

In the drawing of Figure 2, the percentage cut-off is 50 percent. It has been found desirable for most efficient operation of the present invention, to employ cut-off values within the range of 30 to 70 percent, although somewhat wider values are possible depending upon the particular system in which the separator is used. This application of cut-off permits a constant pressure ratio of expansion, regardless of inlet external pressure. This means that, at high altitudes, the gas in the incoming fluid mixture would be expanded to the same volume by the time it is discharged into the outlet as it would at a sea-level inlet pressure of 15 p. s. i. The particular percent cut-off that is employed should be selected to provide optimum separation of the gas/liquid mixture, depending upon how thoroughly the gas is mixed in the liquid.

Figures 3 and 4 illustrate another form of a separator which may be employed in this invention. The drawings show the separator housing 30 provided with a chamber 32 in which are situated an annular gear 34 and a pinion 36. Further, the construction and operation of the separator of Figures 3 and 4 is analogous to that shown in Figures 1 and 2. The principal difference between these two types of separators is that the one pictured in Figures 1 and 2 is provided with peripheral inlet and outlet, whereas the type shown in Figures 3 and 4 is provided with lateral inlet and outlet. This lateral type of separator is somewhat more effective than the former, since the volume clearance due to the ports is less in the latter, e. g., in the separator illustrated in Figures 3 and 4 the clearance volume amounts to only seven percent of the tooth displacement.

Figure 5 shows a separator of this invention in operation. This separator is substantially identical to that illustrated in Figures 1 and 2 except that the inlet 40 is parallel to the outlet 42, whereas these were perpendicular in the separator of Figures 1 and 2.

Figure 5 shows the separator housing 44 with a chamber 46 in which is located the annular gear 48 and the pinion 50. The separator housing 44 is provided with abutments 52 and 54.

The operation of the apparatus in brief is as follows:

Liquid having gas dispersed therein enters the separator through the inlet 40. This gas/liquid dispersion fills the entire portion of the chamber 46 on the inlet side bounded by the abutments 52 and 54 but the contact of the outer surface of the annular gear 48 with the abutments 52 and 54 prevents flow of fluid directly from the inlet portion of the chamber 46 to the outlet portion of the chamber. Thus the ports 56 in the annular gear 48 are filled with the gas/liquid dispersion. As the gear set rotates in a counterclockwise direction, the spacing between adjacent faces of the pinion and annular gear increases permitting more fluid to enter the tooth spaces.

When the rotation of the gears has been sufficient to bring the leading outer edge of the annular gear tooth in contact with the forward point 58 of the abutment 54, the tooth space is sealed and further flow of fluid into or out of the enclosed space or compartment formed by the adjacent faces of the pinion 50 and the annular gear 48, and by the face of the abutment 54 is prevented. Further rotation of the gears results in an increase of the volume of the compartment, because of the further recession of the face of the pinion teeth from the annular gear teeth. Since the liquid is substantially non-expansible relative to the gas in the dispersion under treatment, the gas in the dispersion is caused to expand as a result of this increase in volume of the compartment in which it is trapped. This is illustrated in Figure 5 by the increase in the size of the gas bubbles 62 from the point 58 to the point 64.

When the gears of the separator have revolved sufficiently so that the trailing edge of the tooth of the annular gear 48 has proceeded beyond the far edge 64 of the abutments 54, i. e., when the tooth space has reached its maximum, the seal of the compartment is broken and this space again comes into fluid contact with housing chamber 46. Further rotation of the gears causes the liquid and gas bubbles formed by the above described expansion operation to be discharged from the separator through the outlet 42.

The separators of this invention operate with maximum efficiency when the fluids on the outlet side of the separator are subjected to less external pressure than the fluid on the inlet side. Preferably, they should be operated with no appreciable restriction to flow on the outlet side, so as to permit free exit of the liquid and separated gas. For this purpose, the outlet area should preferably be larger than the inlet area, although it is to be understood that successful operation of the device as a separator would not be materially affected by such a small pressure increase as would be applied by reducing the outlet opening to the same size as the inlet.

Disregarding the volume of clearance due to the peripheral ports such as 56, 60, a separator with a fifty percent cut-off as shown in Figure 5, will have tooth space compartments, e. g., 62, which double in size during the time that the tooth spaces are sealed off from fluid contact with the housing chamber 46. If a fluid mixture containing 10% by volume of gas is passed through such a unit, the expansion ratio of the gas in the sealed off tooth space compartments would be about 11:1. In other words, since the liquid of the fluid mixture in each sealed off tooth space does not expand appreciably with pressure relative to the gas, the gas in the fluid mixture would be expanded to eleven times its original volume. Expansion takes place inside the tooth space at its maximum volume just before being opened to the outlet, thereby forming fewer but larger bubbles, because in the tooth space the bubbles are expanded until groups of them join together to form single, larger bubbles. These larger bubbles are recompressed to atmospheric size when exposed to the outlet; hence the outlet gas-liquid volume or flow is substantially the same at the outlet as at the inlet.

In addition to the expansion operation, the fluid mixture undergoes another important operation in passing through my separator. Thus, the fluid mixture is subjected to centrifugal force due to the rotation of the gears and this greatly aids in the separation of the components of the fluid mixture. Hence, since the liquid is more dense than the gas, the liquid collects at the outer periphery of the gear tooth compartments and the enlarged gas bubbles are caused to coalesce, probably being assisted in such coalescence by the stretching and thinning of the liquid film around them caused both by their enlargement and by the withdrawal of liquid outward by centrifugal force, leaving less liquid to separate the bubbles. These large bubbles do not remix on the outlet side, but are free to escape, as shown in Figure 5. It will be seen, therefore, that my process is uniquely efficient in effecting separation of gases from liquids, since it makes possible the subjection of fluid mixtures to the simultaneous action of two forces for producing such separations, i. e., reduced pressure and centrifugal force.

Figure 7 illustrates an application of my gas/liquid separator on the lubrication system of an airplane. A comparable lubrication system of conventional design is shown in Figure 6. These figures show the engine 70 provided with an outlet pipe 72. A scavenge pump 74 and an oil cooler 76 are connected in the fluid line 72.

In the conventional system of Figure 6, the pipe 72 discharges into a hopper 74 located in the oil supply tank 76. Any gas which separates from the oil 78 in the hopper 74 escapes through the vent 80. From the supply tank 76, the oil is recycled to the engine 70 through the pipe 82 and the pressure pump 84.

The form of lubrication system shown in Figure 7 differs from that of Figure 6 in that the supply tank 76 is provided with a tray 86 and one of my gas/liquid separators 88. In this improved system, the oil from engine 70 discharges from line 72 into the tray 86. From the tray 86, the oil is raised by the separator, which is driven by the motor 90, through the pipe 92. The separator 88 operates as described above to separate any gas dispersed in the oil. The oil and separated gas are discharged from the separator 88 through the pipe 94 into the hopper 74, from which the separated gas exits through the vent 80. The gas-free oil 94 flows from the hopper 74 and tank 76 back to the engine 70 by way of the return line 82 and pressure pump 84.

The improved type oil lubrication system shown in Figure 7 is capable of removing many times the amount of air or other gas entrained in the oil than is possible in a conventional system such as that illustrated in Figure 6. Systems which employ the style of separator shown in Figures 3 and 4 are particularly desirable for airplane use because of their advantages at high altitudes, i. e., low clearance volume, low internal pressure loss and good pick up of incoming fluid.

I claim:

1. A liquid-gas separator comprising a chamber having a fluid inlet, a fluid outlet, and a pair of spaced abutments between the inlet and outlet, rotatable fluid pumping members mounted in said chamber and providing a series of fluid compartments of expanding volume on the side of one such abutment presented to said inlet and of contracting volume on the other side thereof presented to said outlet, the other such abutment being so located as to seal the fluid compartments of said pumping members before the volumes thereof are fully expanded, and of such length as to maintain the same sealed until their volumes are substantially fully expanded, whereby bubbles of gas entrained in the liquid therein will expand and merge for more ready separation from the liquid at the outlet.

2. A liquid deaerator comprising a chamber having a fluid inlet and a fluid outlet, spaced abutments between the inlet and outlet, respectively, of said chamber, an internally toothed gear rotatable in said chamber in peripheral sealing contact with said spaced abutments and presented to the inlet and outlet intermediate said abutments, a pinion mounted eccentrically with respect to said internally toothed gear having one less tooth than said gear, the eccentric mounting being so related to said abutments that the gear and pinion pass through full mesh position adjacent one such abutment and are in opening mesh as they rotate into sealing contact with the second abutment, in which position of sealing contact with said first abutment the interdental spaces form fluid tight compartments which increase in volume after being sealed with a quantity of aerated liquid therein, whereby entrained bubbles of gas coalesce and more readily separate from the discharged liquid at the outlet.

3. A rotary pump comprising a chamber and rotor means mounted therein, defining compartments which vary in volume with rotation of the rotor means, an inlet and an outlet communicating respectively with the interior of the chamber, a pair of abutments within said chamber, one said abutment being located in the region where said compartments are of expanding volume and the other said abutment being located in the region where said compartments are substantially fully collapsed extending into contact with said rotor means to seal the compartments defined thereby as the same pass said abutments, the said abutment to which the expanding compartments are presented being so located that flow of fluid to said compartments is cut-off when said compartments are between 30 and 70 per cent of their maximum expanded volume.

4. In combination, a source of liquid containing gas dispersed therein, a fluid-tight chamber having a fluid inlet connected to said source, and an outlet, a pair of internal-external toothed gears within said chamber, one such gear being mounted eccentrically with respect to the other to provide expanding tooth spaces in the direction of fluid flow between the inlet and outlet, abutment means within said chamber extending into sealing contact with said gears, said abutment means having oppositely disposed shoulders adjacent the inlet and outlet which, respectively, are so located as to cut-off flow of fluid from the inlet into the gear tooth spaces when the same are only partly expanded and to permit discharge of fluid therefrom to the outlet immediately following expansion of the gear tooth spaces to their maximum volume.

5. In combination, a source of liquid containing gas dispersed therein, a fluid-tight chamber having a fluid inlet connected to said source, and an outlet, a pair of meshing internal-external toothed gears within said chamber, one such gear being mounted eccentrically with respect to the other, driving means for said gears, an abutment coacting with one of said gears for sealing off said inlet from said outlet when said gears are not in motion, and for sealing off the individual tooth spaces formed by the meshing relationship of said gears in rotation between the inlet and outlet, said abutment being arranged to seal the individual tooth spaces adjacent said inlet when they are expanded to approximately fifty per cent of their maximum volume in receding mesh of the rotating gears, said abutment being of such length that it seals the expanding tooth spaces until their expansion to maximum volume has occurred, whereafter they are exposed to the outlet, and a second abutment sealing the outlet from the inlet in rotation of said gears.

6. In combination, a source of liquid containing gas dispersed therein, a fluid-tight chamber having a fluid inlet connected to said source, and an outlet, a pair of meshing internal-external toothed gears within said chamber, one such gear being mounted eccentrically with respect to the other, whereby in rotation the interengaging teeth thereof enter into and recede from full mesh and thereby provide tooth space compartments of varying volumes, and an abutment in sealing contact with said gears, extending between said inlet and outlet from a point where the tooth space compartments of said pair of gears are expanding in volume to a point immediately beyond that at which the same are expanded to maximum volume.

BRUCE R. WALSH.

REFERENCES CITED

The following references are of record in the file of this patent:

UNITED STATES PATENTS

| Number | Name | Date |
|---|---|---|
| 1,818,430 | Ricardo | Aug. 11, 1931 |
| 1,902,315 | Vogt | Mar. 21, 1933 |
| 1,993,721 | Pigott | Mar. 5, 1935 |
| 2,022,781 | Pigott | Dec. 3, 1935 |
| 2,052,474 | Johnson | Aug. 25, 1936 |
| 2,060,242 | Pulley | Nov. 10, 1936 |
| 2,195,812 | Czarnecki | Apr. 2, 1940 |
| 2,225,228 | Nuson | Dec. 17, 1940 |
| 2,337,449 | Cattaneo | Dec. 21, 1943 |
| 2,417,701 | Parsons | Mar. 18, 1947 |

FOREIGN PATENTS

| Number | Country | Date |
|---|---|---|
| 501,693 | Great Britain | Mar. 3, 1939 |
| 120,680 | Germany | June 5, 1901 |